(12) United States Patent
Hirosaki

(10) Patent No.: US 7,815,817 B2
(45) Date of Patent: *Oct. 19, 2010

(54) PHOSPHOR AND PROCESS FOR PRODUCING THE SAME

(75) Inventor: Naoto Hirosaki, Ibaraki (JP)

(73) Assignee: National Institute for Materials Science, Ibaraki (JP)

(*) Notice: Subject to any disclaimer, the term of this patent is extended or adjusted under 35 U.S.C. 154(b) by 473 days.

This patent is subject to a terminal disclaimer.

(21) Appl. No.: 11/909,367

(22) PCT Filed: Mar. 20, 2006

(86) PCT No.: PCT/JP2006/305609

§ 371 (c)(1),
(2), (4) Date: Sep. 21, 2007

(87) PCT Pub. No.: WO2006/101095

PCT Pub. Date: Sep. 28, 2006

(65) Prior Publication Data

US 2009/0057611 A1   Mar. 5, 2009

(30) Foreign Application Priority Data

Mar. 22, 2005   (JP) ............................. 2005-081573

(51) Int. Cl.
*C09K 11/59* (2006.01)
*C09K 11/64* (2006.01)
*H01L 33/00* (2010.01)

(52) U.S. Cl. .............................................. 252/301.4 F

(58) Field of Classification Search ............ 252/301.4 F
See application file for complete search history.

(56) References Cited

U.S. PATENT DOCUMENTS

| | | | |
|---|---|---|---|
| 7,253,446 B2 * | 8/2007 | Sakuma et al. ............... 257/98 |
| 7,544,310 B2 * | 6/2009 | Hirosaki ................ 252/301.4 F |
| 2003/0168643 A1 | 9/2003 | Mitomo et al. |
| 2005/0001225 A1 | 1/2005 | Yoshimura et al. |

FOREIGN PATENT DOCUMENTS

| | | |
|---|---|---|
| EP | 0 155 047 | 9/1985 |
| EP | 1 445 295 | 8/2004 |
| EP | 1 884 552 | 2/2008 |
| JP | 60-206889 A | 10/1985 |
| JP | 2002-363554 A | 12/2002 |
| JP | 2003-096446 | 4/2003 |
| JP | 2003-203504 A | 7/2003 |
| JP | 2003-336059 A | 11/2003 |
| JP | 2004-186278 | 7/2004 |
| JP | 2004-238505 A | 8/2004 |
| JP | 2004-277663 | 10/2004 |
| JP | 2005-008793 A | 1/2005 |
| JP | 2005-255895 A | 9/2005 |
| JP | 2006-008721 A | 1/2006 |
| WO | WO 2005/019376 A1 | 3/2005 |
| WO | WO 2005/033247 A1 | 4/2005 |
| WO | WO 2005/087896 A1 | 9/2005 |

OTHER PUBLICATIONS

Chong-Min Wang et al, "Silicon nitride crystal structure and observations of lattice defects", Journal of Materials Science, 1996, vol. 31, pp. 5281-5298.
Supplementary European Search Report issued in European Patent Application No. 06729577.4 on Jul. 31, 2009.
Naoto Hirosaki, et al. "Characterization and properties of green-emitting β-SiAlON:$Eu^{2+}$ powder phosphors for white light-emitting diodes", Applied Physics Letters, vol. 86, May 17, 2005, pp. 211905-1-211905-3, XP002536727.
European Search Report issued in European Patent Application No. 06729578.2 on Dec. 23, 2009.
S.B. Aldabergenova et al., "Blue, green and red emission from $Ce^{3+}$, $Tb^{3+}$ and $Eu^{3+}$ ions in amorphous GaN and AlN thin films", Journal of Non-Crystalline Solids 299-302 (2002), pp. 709-713.

* cited by examiner

*Primary Examiner*—C. Melissa Koslow
(74) *Attorney, Agent, or Firm*—Alfred A. Stadnicki

(57) ABSTRACT

A green phosphor that exhibits a green luminance higher than those of conventional rare-earth-activated sialon phosphors, having durability higher than those of conventional oxide phosphors, and that emits light by ultraviolet or visible light. There is provide a phosphor comprising a crystal of oxynitride or nitride with β-type $Si_3N_4$ crystal structure and, solid dissolved therein, Eu, which phosphor emits a fluorescence having a peak at a wavelength falling within the wavelength region of 500 to 600 nm upon excitation source irradiation. The luminous intensity within the wavelength region of 500 to 600 nm is high, so that the phosphor is excellent as a green phosphor.

8 Claims, 3 Drawing Sheets

PHOSPHOR AND PROCESS FOR PRODUCING THE SAME

FIELD OF THE INVENTION

The present invention relates to a phosphor which emits a green fluorescent light having an emission peak in a wavelength region that is at least 500 nm and does not exceed 600 nm upon irradiation of an ultraviolet ray or a visible light having a wavelength of 250 nm to 500 nm or an electron beam, wherein the phosphor has a $\beta$-$Si_3N_4$ crystal structure, and a manufacturing method thereof.

BACKGROUND OF THE INVENTION

The phosphor is utilized in a fluorescent display tube (VFD: vacuum fluorescent display), a field emission display (FED), a plasma display panel (PDP), a cathode-ray tube (CRT) a white light-emitting diode (LED), and so on. In any of these applications, it is necessary to provide the phosphor with energy to excite the phosphor in order to have the phosphor emit the fluorescent light and the phosphor is excited by an excitation source with high energy such as a vacuum ultraviolet ray, an ultraviolet ray, an electron beam, and a blue light so as to emit a visible light ray. However, as a result that the phosphor is exposed to such excitation source, the brightness of the phosphor is lowered so that the phosphor itself tends to be degraded. Therefore, the phosphor having the brightness little degraded is desired. Therefore, a sialon phosphor has been proposed as a phosphor having the brightness little degraded instead for the conventional phosphor such as silicate phosphor, phosphate phosphor, aluminate phosphor, and sulfide phosphor.

As an example of these sialon phosphors is manufactured in the following manufacturing process as generally described below. First, silicon nitride ($Si_3N_4$), aluminum nitride (AlN), Europium oxide ($Eu_2O_3$) are mixed at predetermined molar ratios thereof and the resultant mixture is fired by a hot press method in one atmosphere (0.1 MPa) of nitrogen atmosphere at 1700 degree Celsius for one hour (for example, refer to Patent reference 1). It was reported that $\alpha$-sialon activated by Eu ion manufactured in the above process became a phosphor to emit a yellow light of wavelength region of 550 nm to 600 nm if it is excited by the blue light having a wavelength region of 450 to 500 nm.

Further, a blue phosphor activated by Ce having a host crystal of JEM phase ($LaAl(Si_{6-z}Al_z)N_{10-z}O_z$) (refer to Patent reference 2), a blue phosphor activated by Ce having a host crystal of $La_3Si_8N_{11}O_4$ (refer to Patent reference 3), and a red phosphor activated by Eu having a host crystal of $CaAlSiN_3$ (refer to Patent reference 4) are known.

However, a phosphor which emits a green luminescence as well as phosphors which emit a blue luminescence and a yellow luminescence, respectively, is in demand for the application to a plasma display and a white light LED utilizing an ultraviolet LED as an excitation source.

[Patent reference 1] Japanese patent application publication No. 2002-363554.

[Patent reference 2] Japanese patent application No. 2003-208409.

[Patent reference 3] Japanese patent application No. 2003-346013.

[Patent reference 4] Japanese patent application No. 2003-394855.

As another sialon phosphor, a phosphor of $\beta$-sialon doped with a rare earth element is also known (refer to Patent reference 5) and it is shown that phosphors activated by Tb, Yb, and Ag are those which emit a green light of 525 nm to 545 nm. However, a phosphor having a high brightness has not been obtained since the activating elements do not solid solve adequately into the host crystal, but reside in the boundary phase because the synthesis temperature is so low as 1500 degree Celsius.

[Patent reference 5] Japanese patent application publication No. S60-206889.

As another sialon phosphor, a phosphor of $\beta$-sialon doped with divalent europium is also known (refer to Patent reference 6) and it is shown that the phosphor becomes a green phosphor. However, the emission intensity of the green light is particularly so strong that the phosphor would become more desirable as a sialon phosphor.

[Patent reference 6] Japanese patent application No. 2004-070894.

DESCRIPTION OF THE INVENTION

Problems to be Solved by the Invention

An object of the present invention is to try to satisfy such demand and to provide a green phosphor that has high durability and emits a green light with a particularly high brightness wherein the green phosphor is a sialon phosphor activated by a rare earth element, i.e., to which Eu is added.

Means for Solving Problems

The present inventor has found, as a result of intensive investigations on the nitrides, that some of the nitrides including Eu and Si, Al, O, and N can become a phosphor that emits a fluorescent light having an emission peak in a wavelength region that is at least 500 nm and does not exceed 600 nm if such nitrides have a specific composition range, a specific solid solution state, and a specific crystal phase. That is, it has been found that a solid solution crystal doped with divalent Eu ion as the center of luminance, which includes a nitride or oxynitride having a $\beta$-$Si_3N_4$ crystal structure as a host crystal, could become a phosphor that emits a fluorescent light having a peak in a wavelength region that is at least 500 nm and does not exceed 600 nm. In particular, it has been found that a $\beta$-type sialon having synthesized at a temperature higher than 1820 degree Celsius could emit a green fluorescent light having a good chromatic purity and a peak in a wavelength of 500 nm to 550 nm as the $\beta$-type sialon crystal solid-solves Eu.

The $\beta$-$Si_3N_4$ crystal structure has symmetry of $P6_3$ or $P6_3/m$ and is defined as a structure which has ideal atomic positions (refer to Non-Patent reference 1). As nitride or oxynitride having this type of crystal structure, $\beta$-$Si_3N_4$, $\beta$-sialon ($Si_{6-z}Al_zO_zN_{8-z}$, Here, $0<z<4.2$) and so on are known. Further, it is supposed that $\beta$-sialon does not solid-solve a metal element if the $\beta$-sialon is synthesized at a temperature lower than 1700 degree Celsius and it is known that a metal oxide added as a sintering agent forms a glass phase in the grain boundaries in which the metal oxide resides. When a metal element is incorporated into the sialon crystal, $\alpha$-sialon is used as disclosed in Patent reference 1. In Table 1, the crystallographic structural data is shown based on the atomic coordinate of $\beta$-silicon nitride.

[Non-Patent reference 1] Chong-Min Wang, et. al.; "Journal of Materials Science" pp. 5281-5298, vol. 31 in 1996.

TABLE 1

Atomic coordinate of β-Si₃N₄ crystal

|  | x/a | y/a | z/c |
|---|---|---|---|
| Si: 6(h) | 0.7686 | 0.1744 | 0.2500 |
| N1: 6(h) | 0.0298 | 0.3294 | 0.2628 |
| N2: 2(c) | 0.6667 | 0.3333 | 0.2392 |

Space group: P6₃

Lattice constant a=0.7595 nm, c=0.29023 nm

R. Grun, Acta Crystallogr. B35 (1979) 800

The β-Si₃N₄ and the β-sialon have been investigated as heat resistant material, but the description that optically activating elements are solid-solved in the host crystal and that the crystal with solid solution is utilized as a phosphor is made only in Patent reference 5 with respect to the specific elements.

According to Patent reference 5, as a phosphor having a fluorescent peak in a wavelength region of 500 nm to 600 nm, only the phosphors with the addition of Tb, Yb, and Ag were reported. However, the phosphor doped with Tb shows the excitation wavelength is equal to 300 nm or less so that it cannot be used for the application to the white LED. Since it has a long emission lifetime such that it causes the image lag, it is not easy to apply it to the display application. Further, the phosphor doped with Yb or Ag has a low brightness. Also, it was attempted to apply the crystal having the β-Si₃N₄ crystal structure as the phosphor in Patent reference 6, but it is always desired to improve the emission intensity even more.

That is, the sialon crystal having a β-Si₃N₄ crystal structure in which Eu is solid solved can be used as a phosphor that can emit a green emission light with a high brightness as being excited by an ultraviolet ray and a visible light, and an electron beam or an X-ray and such effects are extremely significant in the sialon phosphor having a specific composition. As a result, the configurations recited in the following (1) to (5) are rendered so as to provide a phosphor and a method of manufacturing the same showing a luminescence phenomenon characterized by an extremely high brightness in a specific wavelength region. The configurations are described in the following (1) to (5).

(1) A phosphor comprising: a sialon crystal in which Eu is solid-solved, the sialon crystal having a β-Si₃N₄ crystal structure and a composition expressed by a composition formula of $Eu_aSi_bAl_cO_dN_e$ (here, a+b+c+d+e=1 in the formula) wherein parameters: a, c, and d satisfy following conditions:

$0.00035 \leq a \leq 0.002$ (1), $0.008 \leq c \leq 0.025$ (2), and $0.0005 \leq d \leq 0.01$ (3); and wherein the phosphor emits a green fluorescent light having a peak in a wavelength region of 500 nm to 600 nm upon irradiation of an excitation source.

(2) The phosphor according to the above (1) wherein the parameters: a, b, c, d, and e satisfy a following condition:

$0.72 \leq (a+b+c)/(d+e) \leq 0.78$.

(3) The phosphor according to the above (1) or (2) wherein the sialon crystal has a molar composition expressed by a composition formula of: $fSi_3N_4 \cdot gAlN \cdot hEu_2O_3$ (f+g+h=1 in the formula) and wherein parameters: g and h satisfy conditions: $0.04 \leq g \leq 0.14$, and $0.002 \leq h \leq 0.006$.

(4) A method of manufacturing the phosphor recited in any one from the above (1) to (3), the method comprising the step of: firing a mixture of silicon nitride powder; aluminum nitride powder; and a raw material including Eu in a nitrogen atmosphere in a temperature range that is at least 1820 degree Celsius and does not exceed 2200 degree Celsius.

(5) The method according to the above (4) wherein the raw material including Eu is europium oxide, wherein a mixture molar composition of silicon nitride; aluminum nitride; and europium oxide is expressed by a composition formula: $iSi_3N_4 \cdot jAlN \cdot kEu_2O_3$ (i+j+k=1 in the formula), and wherein the parameters: j and k satisfy: $0.04 \leq j \leq 0.14$, and $0.002 \leq k \leq 0.006$.

A phosphor according to the present invention is excellent as a green phosphor because the emission intensity in the wavelength region of 500 nm to 600 nm is stronger than that of the conventional sialon or oxynitride phosphor since the phosphor includes a sialon crystal having β-Si₃N₄ crystal structure as a main component. Even if the phosphor is exposed to the excitation source, the brightness of this phosphor is not lowered and nitride compound which leads to a useful phosphor to be utilized in VFD, FED, PDP, CRT, and, white LED is provided.

BEST MODE TO CARRY OUT THE INVENTION

Figure 1:
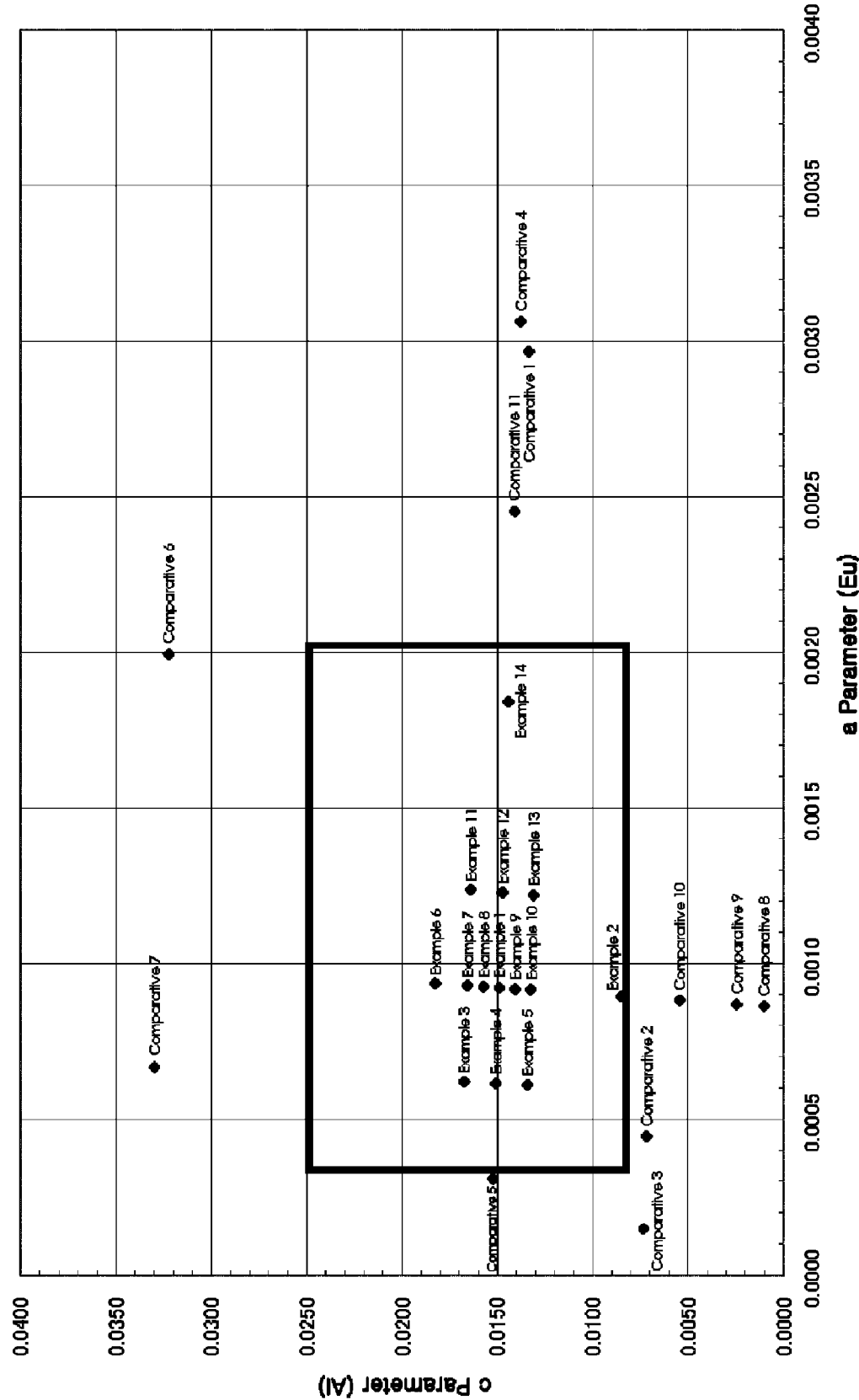
FIG. 1 is a diagram showing parameters: 'a' and 'c' of examples and comparative examples. The range: $0.00035 \leq a \leq 0.002$ and $0.008 \leq c \leq 0.025$ is indicated by a bold line.

In the following, the examples of the present invention are described in detail.

The fluorescent substance (or phosphor) of the present invention includes a sialon solid solution having the β-Si₃N₄ crystal structure (hereinafter, the solid solution being called β-Si₃N₄ type crystal) as a main component. The β-Si₃N₄ type crystal can be identified by the X-ray diffraction or neutron diffraction. Not only a substance showing the same diffraction pattern as the pure β-Si₃N₄, but also a substance having changed lattice parameters as other elements substitute original constituent elements may be included in the β-Si₃N₄ type crystal. Further, depending on the type of the solid solution, a point defect, a plane defect, and a stacking fault are introduced into the crystal such that solid-solved elements may be concentrated in defect parts in grains. However, such sialon solid solution can also be included in the β-Si₃N₄ type crystal as long as the basic pattern in the chart of the X-ray diffraction does not change. Also, a polytype having a long period structure may sometimes be formed due to the periodicity of defect formation in a crystal. But, such crystal may also be included in the β-Si₃N₄ type crystal as long as the basic crystal structure is β-Si₃N₄ crystal structure.

Here, the pure β-Si₃N₄ crystal structure belongs to the hexagonal system having P6₃ or P6₃/m symmetry, and is a crystal defined as a structure having ideal atom positions (refer to Non-patent reference 1). The position of each atom may deviate from the ideal position by about ±0.05 depending on the kind of the atom.

The basic lattice constants thereof are a=0.7595 nm and c=0.29023 nm. When its constituent Si is replaced by an element such as Al, N is replaced by an element such as O, or a metal atom such as Eu is introduced to form a solid solution, the lattice constants change. However, the basic crystal structure, sites occupied by the atoms, and atom positions designated by the coordinates do not change greatly. Therefore, once the lattice constants and the plane indices of the pure β-$Si_3N_4$ are given, the positions of X-ray diffraction peaks (2θ) are almost uniquely determined. When the lattice constants calculated using X-ray diffraction results obtained for a new substance substantially coincide with the data from diffraction peak positions (2θ) calculated using the plane indices of the pure substance, the crystal structure of the new substance is determined to be identical to that of the pure substance.

In the present invention, from a view point of fluorescent luminescence, it is preferable for the phosphor to have a high volume of pure sialon crystalline phase, which comprises preferably a single phase, wherein the sialon crystalline phase has the β-$Si_3N_4$ crystal structure as a configuration component. However, the phosphor may be configured with a mixture of other crystalline phases or an amorphous phase as long as the fluorescent property is not lowered. In such an event, it is preferable to make the content of the sialon crystalline phase having the β-$Si_3N_4$ crystal structure at least 50 mass % in order to obtain a high brightness.

Since metal element: Eu is solid-solved into a host crystal of sialon crystal having the β-$Si_3N_4$ crystal structure, divalent europium ion can serve as a luminescent center such that the fluorescent property is exhibited.

The phosphor emits a fluorescent light having a peak in a wavelength region of 500 nm to 600 nm upon irradiation of the excitation source according to the present invention. The emission spectrum having the peak in the wavelength region is a green color. In particular, a spectrum of rather sharp shape with a certain width which has a peak in a wavelength region of 500 nm to 550 nm is a green light with a high color purity and falls on an area of $0 \leq x \leq 0.3$ and $0.5 \leq y \leq 0.83$ in the CIE chromaticity coordinate (x, y).

As the excitation source of the phosphor, light (a vacuum ultraviolet ray, a deep ultraviolet ray, an ultraviolet ray, a near-ultraviolet ray, a visible light from violet to blue) having the wavelength that is at least 100 nm and does not exceed 500 nm and an electron beam and an X-ray are utilized for the fluorescent light with a high brightness.

In the present invention, the sialon having the β-$Si_3N_4$ crystal structure and a composition given by a formula: $Eu_a Si_b Al_c O_d N_e$ (in the formula, a+b+c+d+e=1) would become a phosphor which emits a green light with a high emission intensity upon irradiation of the excitation source, wherein the parameters: a, c, and d satisfy the following formulas:

$$0.00035 \leq a \leq 0.002 \quad (1),$$

$$0.008 \leq c \leq 0.025 \quad (2), \text{ and}$$

$$0.0005 \leq d \leq 0.01 \quad (3).$$

The parameter: 'a' represents an amount of Eu ion which functions to emit a luminescence light and the emission intensity may be lowered if 'a' is less than 0.00035. On the other hand, the emission intensity may also be lowered due to the concentration quenching caused by interactions between luminescence ions if 'a' is larger than 0.002. The parameter: 'c' represents an amount of Al which constitutes the sialon and if 'c' is less than 0.008, it would be difficult to form the stable sialon so that it is considered that it would be more difficult to incorporate Eu ion in the crystal such that the emission intensity may be lowered. On the other hand, if 'c' becomes larger than 0.025, the emission intensity may also be lowered because of too much amount of solid solution of Al. The parameter: 'd' represents an amount of oxygen and the emission intensity may be lowered since it becomes more difficult to solid solute Eu if 'd' is smaller than 0.0005. On the other hand, if 'd' is larger than 0.01, it is considered that the electron state as the nitride crystal would be changed such that the emission intensity may be lowered.

In particular, if the ratio of the amount of the cations (a+b+c) to the amount of the anions (d+e) satisfies the condition: $0.72 \leq (a+b+c)/(d+e) \leq 0.78$ in the composition, it is considered to form a stable sialon such that the emission intensity may become higher. If the ratio is out of the range, it becomes more difficult to form a stable sialon such that the emission intensity may be lowered. More preferably, $(a+b+c)/(d+e) = 0.75$, or the $(a+b+c)/(d+e)$ is substantially equal to 0.75.

Further, if the composition is expressed by a molar composition formula: $fSi_3N_4 \cdot gAlN \cdot hEu_2O_3$ (here, f+g+h=1) and the parameters: 'g' and 'h' satisfy the conditions: $0.04 \leq g \leq 0.14$ and $0.002 \leq h \leq 0.006$, the emission intensity may become even higher.

In the present invention, it is preferable to form single crystalline phase of nitride or oxynitride having the β-$Si_3N_4$ crystal structure as the crystalline phase, but it is also possible to have a mixture with other crystalline phases or an amorphous phase as long as the luminescence characteristics are not lowered. In this case, it is preferable to make the amount of crystalline phase of the nitride or oxynitride having the β-$Si_3N_4$ crystal structure at least 50 mass % such that the brightness may be high. The relative amount of the crystalline phase may be obtained from the ratio of the strongest peaks of respective phases: the crystalline phase of the nitride or oxynitride having the β-$Si_3N_4$ crystal structure and the other crystalline phases as the X-ray diffraction measurement is conducted.

The shape of the phosphor of the present invention is not particularly limited thereto, if the phosphor is used in a powder state, it is preferable to prepare a single crystal thereof having an average particle diameter that is at least 50 nm and does not exceed 20 μm such that the phosphor has a high brightness. Further, it is preferable for the phosphor particle to have an aspect ratio (a value given by dividing a long axis of the particle by a short axis thereof) less than 1.5, which a sphere shape typically shows, such that the phosphor is easy to handle in a dispersion process and a paint-applying process.

The method of manufacturing the phosphor according to the present invention is not particularly limited hereto, but, by way of example, the following method may be utilized.

A raw material mixture which is a mixture of metal compounds and capable of forming a $Eu_a Si_b Al_c O_d N_e$ composition by firing is fired in a nitrogen atmosphere. The optimum firing temperature depends on the composition and cannot be specified for all cases, but, generally, a temperature range that is at least 1820 degree Celsius and does not exceed 2200 degree Celsius is utilized so as to obtain a stable green phosphor. If the firing temperature is lower than 1820 degree Celsius, it is considered that the element Eu to form a luminescence center is not sufficiently solid-solved in the nitride or oxynitride of the β-$Si_3N_4$ crystal structure and may often remain in grain boundaries in which a large amount of oxygen exists so that the phosphor emits a fluorescent light from the luminescence center hosted by an oxide glass so that the fluorescent light is in a shorter wavelength region such as a blue light and it is unlikely to be a green light. In Patent reference 5, even if Eu is employed as an activator element, the emission wavelength resides in a blue region of 410 to 440 nm, which is interpreted as essentially different from the green emission wavelength of 500 to 550 nm, which is the emission wavelength of the phosphor of the present invention. In the meanwhile, if the firing temperature of 2200° C. or higher is made, special facilities are generally required in consideration of the device durability, which is not necessarily suitable for the industrial production. Here, a general manufacturing method utilizing a solid phase reaction (a liquid phase reaction or a vapor phase reaction may be partially involved) is described, but the manufacturing method is not limited hereto. It should be understood that another manufacturing method may be employed and another condition in which Eu is capable of forming a solid solution may be applied to manufacture the phosphor.

The mixture of metal compounds may be a mixture of: a metal compound including Eu selected from metal, oxide, carbonate, nitride, or oxynitride of Eu; silicon nitride; and aluminum nitride. These compounds have such advantages, in addition to their reactive properties and readiness to obtain a synthesized compound with a high purity, that they are easily available since they are produced as industrial raw materials.

As the raw material, a raw material including Eu is europium oxide. It is preferable to use silicon nitride, aluminum nitride, and europium oxide since they are reactive and easy to handle. The mixture molar ratios may be expressed by: $iSi_3N_4.jAlN.kEu_2O_3$ (here, $i+j+k=1$) wherein the parameters: 'j' and 'k' satisfy the condition: $0.04 \leq j \leq 0.14$ and $0.002 \leq k \leq 0.006$. This composition range is more preferable since the fired phosphor of such composition can have a high brightness.

As the nitrogen atmosphere, a gaseous atmosphere in a pressure range that is at least 0.1 MPa and does not exceed 100 MPa is preferable. It is more preferable to have the pressure range that is at least 0.5 MPa and does not exceed 10 MPa. When silicon nitride is used as a raw material and the firing process is performed at a temperature of 1820 degree Celsius or higher, the silicon nitride contained in the raw materials decomposes easily in a nitrogen atmosphere of 0.1 MPa or lower. When the nitrogen atmosphere has a pressure of higher than 0.5 MPa, the silicon nitride as the raw material hardly decomposes. If the nitrogen atmosphere has a pressure of 10 MPa, the pressure is high enough. A pressure of 100 MPa or higher requires special facilities for the durability since the pressure is very high and it is considered that such high pressure does not suit for the industrial production.

By using a method in which metal compound as powder or aggregate is charged in a container while maintaining a filling rate of a bulk density that does not exceed 40% and then fired, the phosphor emitting a fluorescent light having a particularly high brightness may be obtained. When fine powder of a particle diameter of several micrometers is employed as a starting material, a mixture of metal compound after completion of a mixing process exhibits morphology in which the fine powder of a particle diameter of several micrometers aggregates to a size of several hundreds of micrometers to several millimeters (hereinafter called powder aggregate). In the present invention, the powder aggregate is fired in a state of maintaining a filling rate of a bulk density that does not exceed 40%.

That is, in usual sialon production, the firing process is performed after molding by a hot-press method or die molding, and hence the firing process is applied to a state in which a powder filling rate is high. In the present invention, however, the powder aggregate of a mixture in which the particle size is made uniform is charged into a container or the like with a filling rate of a bulk density that does not exceed 40% without applying any mechanical force or without molding with a die in advance. If necessary, the powder aggregate may be subjected to particle size control by granulating to an averaged particle diameter that does not exceed 500 µm by using a sieve or an air classifier. Otherwise, the powder aggregate may be granulated directly into a shape of 500 µm or smaller using a spray dryer. A container of boron nitride has an advantage of little reactivity with the phosphor.

The reason why the firing process is performed while holding the bulk density that does not exceed 40% is that, when the raw material powder is fired while leaving a free space around the raw material powder, the reaction product as a crystal grows into a free space, it is more unlikely that growing crystals as the product come into contact with each other and it is likely that the synthesized crystals have a smaller number of surface defects. Therefore, a phosphor with a high brightness is obtained. When the bulk density exceeds 40%, partial densification takes place during the firing, and a dense sintered body appears, which hinders crystal growth. As a result, the brightness of the phosphor may be lowered, and fine powder may hardly be obtained. The size of the powder aggregate of 500 µm or smaller is particularly preferable to achieve excellent grinding properties after the firing. The lower limit of the bulk density is not particularly specified, but may be considered as follows from an industrial point of view; the range of the bulk density depends on the size or shape of raw material powder particles, and it is reasonable to take a value of around 10% as the lower limit when the general raw material powder commercially available is employed.

Then, the powder aggregate having a filling rate of 40% or smaller is fired under the above condition. A furnace used for firing is preferably heated by metal resistance heating or graphite resistance heating, and carbon is preferably used as the high temperature part of the furnace because the firing temperature is high and nitrogen is employed as the firing atmosphere. For firing, a sintering method in which no mechanical pressure is applied from the outside, such as normal pressure sintering and gas pressure sintering, is preferable to perform the firing while keeping high bulk density.

When the powder aggregate obtained by firing is solidified hard, the aggregate is milled with a mill usually employed in the factory such as a ball mill, jet mill, and the like. Among them, the particle size is controlled most easily in ball milling. It is preferable that balls and pots are made of sintered silicon nitride body or sintered sialon body for the present purpose. It is particularly preferable to use the equipment made of ceramic having the same composition as the phosphor product. The powder aggregate is continuously ground until an averaged particle diameter thereof becomes 20 µm or smaller. It is particularly desirable to obtain the average particle diameter range that is at least 20 nm and does not exceed 5 µm. When the average particle diameter exceeds 20 µm, the fluidity of the powder and dispersion into resin is deteriorated, and emission intensity may not be uniform from part to part when a light emitting device is built by combining the phosphor with a light-emitting device. When the averaged particle diameter reaches a level of 20 nm or smaller, it becomes more difficult to handle the phosphor powder. If an objective particle diameter is not obtained by grinding alone, classification may be used in combination with the grinding. Sieving, air classification, and settling in a liquid may be employed as means of classification.

Acid treatment may be used as one of the methods of pulverization and classification. In the powder aggregate obtained by firing, a single crystal of nitride or oxynitride of the β-Si₃N₄ crystal structure is in most cases fixed hard at a grain boundary phase which is mainly composed of a small quantity of glass phase. When the powder aggregate is immersed into an acid having a specific composition in such a case, the grain boundary phase mainly consisting of the glass phase is selectively dissolved and single crystals are separated. In this way, every particle is obtained not as an aggregate of single crystals but as a particle consisting of one single crystal of the nitride or oxynitride of the β-Si₃N₄ crystal structure. Such a particle is composed of a single crystal which has only a small number of surface defects, thereby resulting in a phosphor with a high brightness.

Although fine phosphor powder is obtained through the above processes, the heat treatment is effective in order to further improve the brightness. For this purpose, the powder after firing or the powder after particle size adjustment by pulverization and classification can be subject to the heat treatment at a temperature that is at least 1000 degree Celsius and does not exceed the firing temperature. At a temperature lower than 1000° C., the effect of removing surface defects may be relatively low. The heat treatment at a temperature higher than or equal to the firing temperature is not preferable because particles of the ground phosphor tend to aggregate again with each other. An atmosphere suitable for the heat treatment depends on phosphor compositions. As for an atmosphere suitable for the heat treatment, the atmosphere having one or more gases selected from the group consisting of nitrogen, air, ammonia, and hydrogen can be used. Among them, a nitrogen atmosphere is particularly preferable since this atmosphere exhibits a pronounced effect of removing defects.

The thus-obtained nitride of the present invention can have an excitation region extending from the ultraviolet to visible light, which is broader than the excitation region of a usual oxide phosphor and sialon phosphor of the prior art, and can show a green emission having a peak in a wavelength region that is at least 500 nm and does not exceed 600 nm. And hence it is suitable for a lighting device and an image display device. Further, the nitride does not deteriorate even when exposed to high temperatures and then has superior thermal resistance, and excels in a long-term stability in an oxidizing atmosphere and moist environment.

The present invention is described in more detail with the examples to be shown below. However, these examples are disclosed only to help the understanding of the present invention with ease. Therefore, the present invention is not limited to these examples.

EXAMPLES 1-14

Silicon nitride powder of 92%-α-type (E10 grade manufactured by Ube Industries, Ltd.) having an averaged particle diameter of 0.5 μm and containing 0.93 wt % of oxygen; and aluminum nitride powder having a specific surface area of 3.3 m²/g and containing 0.79% oxygen; and europium-oxide powder of 99.9% purity were used for a raw material powder. In the raw material powder, for example, F-grade aluminum nitride produced by Tokuyama Corporation and europium-oxide powder produced by Shin-Etsu Chemical Co., Ltd. were used.

Figure 2:
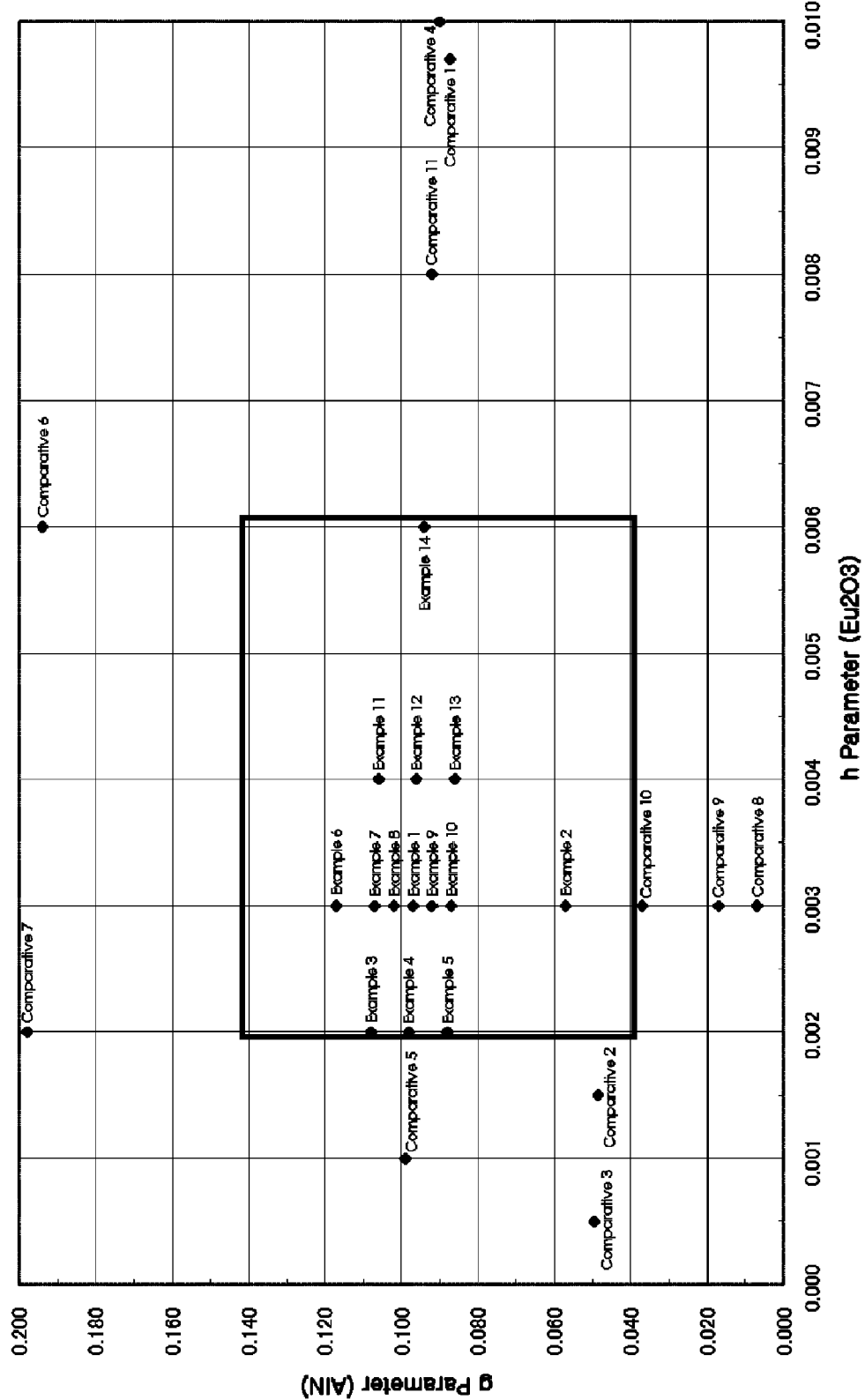
FIG. 2 is a diagram showing parameters: g (AlN) and h (Eu₂O₃) of examples and comparative examples. The range: $0.04 \leq g \leq 0.14$ and $0.002 \leq h \leq 0.006$ is indicated by a bold line.

In order to obtain designed compositions shown in Table 2, silicon nitride powder, aluminum nitride powder, and europium oxide powder were weighed as shown in Table 3, and then mixed for 2 hours with a wet ball mill using a pot made of a silicon nitride sintered body, balls made of a silicon nitride sintered body, and n-hexane. The parameters of the compositions are shown in FIGS. 1 and 2.

TABLE 2

|  | Parameters of designed compostions ||||| 
| --- | --- | --- | --- | --- | --- |
|  | a(Eu) | b(Si) | c(Al) | d(O) | e(N) |
| Example 1 | 0.00092 | 0.4148 | 0.0149 | 0.00138 | 0.56798 |
| Example 2 | 0.00089 | 0.4203 | 0.0085 | 0.00134 | 0.56894 |
| Example 3 | 0.00062 | 0.4136 | 0.0167 | 0.00093 | 0.56815 |
| Example 4 | 0.00061 | 0.4150 | 0.0151 | 0.00092 | 0.56840 |
| Example 5 | 0.00061 | 0.4164 | 0.0134 | 0.00092 | 0.56864 |
| Example 6 | 0.00094 | 0.4119 | 0.0183 | 0.00140 | 0.56748 |
| Example 7 | 0.00093 | 0.4134 | 0.0166 | 0.00139 | 0.56773 |
| Example 8 | 0.00093 | 0.4141 | 0.0157 | 0.00139 | 0.56786 |
| Example 9 | 0.00092 | 0.4155 | 0.0141 | 0.00138 | 0.56811 |
| Example 10 | 0.00091 | 0.4162 | 0.0133 | 0.00137 | 0.56823 |
| Example 11 | 0.00124 | 0.4132 | 0.0164 | 0.00186 | 0.56732 |
| Example 12 | 0.00123 | 0.4146 | 0.0147 | 0.00184 | 0.56757 |
| Example 13 | 0.00122 | 0.4160 | 0.0131 | 0.00183 | 0.56781 |
| Example 14 | 0.00184 | 0.4142 | 0.0144 | 0.00276 | 0.56674 |
| Comparative 1 | 0.00297 | 0.4140 | 0.0133 | 0.00445 | 0.56528 |
| Comparative 2 | 0.00044 | 0.4219 | 0.0072 | 0.00067 | 0.56977 |
| Comparative 3 | 0.00015 | 0.4221 | 0.0073 | 0.00022 | 0.57017 |
| Comparative 4 | 0.00306 | 0.4135 | 0.0138 | 0.00459 | 0.56508 |
| Comparative 5 | 0.00031 | 0.4152 | 0.0152 | 0.00046 | 0.56881 |
| Comparative 6 | 0.00199 | 0.3988 | 0.0322 | 0.00299 | 0.56397 |
| Comparative 7 | 0.00067 | 0.3996 | 0.0330 | 0.00100 | 0.56577 |
| Comparative 8 | 0.00086 | 0.4268 | 0.0010 | 0.00129 | 0.57005 |
| Comparative 9 | 0.00087 | 0.4255 | 0.0025 | 0.00130 | 0.56984 |
| Comparative 10 | 0.00088 | 0.4230 | 0.0054 | 0.00132 | 0.56939 |
| Comparative 11 | 0.00245 | 0.4139 | 0.0141 | 0.00368 | 0.56591 |

TABLE 3

|  | Parameters of compositions ||| Compositions (mass %) |||
| --- | --- | --- | --- | --- | --- | --- |
|  | f(Si3N4) | g(AlN) | h(Eu2O3) | Si3N4 | AlN | Eu2O3 |
| Example 1 | 0.900 | 0.097 | 0.00300 | 96.167 | 3.029 | 0.804 |
| Example 2 | 0.940 | 0.057 | 0.00300 | 97.492 | 1.728 | 0.781 |
| Example 3 | 0.890 | 0.108 | 0.00200 | 96.052 | 3.406 | 0.542 |
| Example 4 | 0.900 | 0.098 | 0.00200 | 96.395 | 3.067 | 0.537 |
| Example 5 | 0.910 | 0.088 | 0.00200 | 96.733 | 2.734 | 0.533 |
| Example 6 | 0.880 | 0.117 | 0.00300 | 95.474 | 3.709 | 0.817 |
| Example 7 | 0.890 | 0.107 | 0.00300 | 95.823 | 3.366 | 0.810 |
| Example 8 | 0.895 | 0.102 | 0.00300 | 95.996 | 3.197 | 0.807 |

TABLE 3-continued

|  | Parameters of compositions | | | Compositions (mass %) | | |
| --- | --- | --- | --- | --- | --- | --- |
|  | f(Si3N4) | g(AlN) | h(Eu2O3) | Si3N4 | AlN | Eu2O3 |
| Example 9 | 0.905 | 0.092 | 0.00300 | 96.337 | 2.862 | 0.801 |
| Example 10 | 0.910 | 0.087 | 0.00300 | 96.506 | 2.696 | 0.798 |
| Example 11 | 0.890 | 0.106 | 0.00400 | 95.595 | 3.327 | 1.078 |
| Example 12 | 0.900 | 0.096 | 0.00400 | 95.940 | 2.990 | 1.070 |
| Example 13 | 0.910 | 0.086 | 0.00400 | 96.279 | 2.659 | 1.062 |
| Example 14 | 0.900 | 0.094 | 0.00600 | 95.489 | 2.914 | 1.597 |
| Comparative 1 | 0.903 | 0.087 | 0.00970 | 94.769 | 2.677 | 2.554 |
| Comparative 2 | 0.950 | 0.049 | 0.00150 | 98.147 | 1.464 | 0.389 |
| Comparative 3 | 0.950 | 0.050 | 0.00050 | 98.372 | 1.498 | 0.130 |
| Comparative 4 | 0.900 | 0.090 | 0.01000 | 94.599 | 2.764 | 2.637 |
| Comparative 5 | 0.900 | 0.099 | 0.00100 | 96.625 | 3.106 | 0.269 |
| Comparative 6 | 0.800 | 0.194 | 0.00600 | 91.770 | 6.503 | 1.727 |
| Comparative 7 | 0.800 | 0.198 | 0.00200 | 92.713 | 6.705 | 0.582 |
| Comparative 8 | 0.990 | 0.007 | 0.00300 | 99.042 | 0.205 | 0.753 |
| Comparative 9 | 0.980 | 0.017 | 0.00300 | 98.741 | 0.501 | 0.758 |
| Comparative 10 | 0.960 | 0.037 | 0.00300 | 98.126 | 1.105 | 0.769 |
| Comparative 11 | 0.900 | 0.092 | 0.00800 | 95.041 | 2.839 | 2.120 |

Then the n-hexane was removed using a rotary evaporator to obtain a dried material of the mixed powder. After grinding the obtained mixture using an agate mortar and pestle, the resultant mixture was passed through a 500 μm sieve, thereby obtaining a powder aggregate having excellent fluidity. This powder aggregate was allowed to fall freely into a boron nitride crucible having a diameter of 20 mm and a height of 20 mm. Next, the crucible was set into an electric furnace of a graphite resistance heating type. In the firing operation, a firing atmosphere was made vacuum with a diffusion pump, and the furnace temperature was raised at a rate of 500° C./h from a room temperature to 800 degree Celsius. Nitrogen of 99.999 vol % purity was introduced into the furnace at 800 degree Celsius so as to make the pressure 1 MPa, and temperature was raised at 500° C./h to the temperatures as shown in Table 4 (1900 degree Celsius or 2000 degree Celsius), and held at each of the temperatures for 8 hours. The synthesized specimen was ground to powder using an agate mortar, and the powder X-ray diffraction measurement (XRD) using the Cu Kα ray was performed. As a result, all the obtained charts showed the β-silicon nitride structure.

TABLE 4

|  | Firing at 1900° C. | | | Firing at 2000° C. | | |
| --- | --- | --- | --- | --- | --- | --- |
|  | Excitation wavelength (nm) | Emission wavelength (nm) | Intensity (arbitrary unit) | Excitation wavelength (nm) | Emission wavelength (nm) | Intensity (arbitrary unit) |
| Example 1 | 301 | 534 | 3996 | 307 | 535 | 6545 |
| Example 2 | 302 | 528 | 5215 | 301 | 528 | 4183 |
| Example 3 | 302 | 529 | 3637 | 303 | 529 | 5606 |
| Example 4 | 301 | 528 | 4003 | 267 | 530 | 5716 |
| Example 5 | 301 | 528 | 3762 | 304 | 530 | 6211 |
| Example 6 | 302 | 536 | 5000 | 304 | 535 | 6427 |
| Example 7 | 303 | 536 | 5373 | 303 | 536 | 7575 |
| Example 8 | 303 | 537 | 5583 | 305 | 536 | 7096 |
| Example 9 | 303 | 536 | 5229 | 303 | 537 | 7101 |
| Example 10 | 301 | 536 | 4719 | 304 | 537 | 7470 |
| Example 11 | 303 | 536 | 4957 | 307 | 536 | 7071 |
| Example 12 | 301 | 535 | 4774 | 306 | 537 | 7017 |
| Example 13 | 302 | 535 | 4626 | 304 | 538 | 6861 |
| Example 14 | 304 | 536 | 3468 | 301 | 537 | 4889 |
| Comparative 1 | 299 | 527 | 993 |  |  |  |
| Comparative 2 | 299 | 525 | 731 |  |  |  |
| Comparative 3 | 201 | 338 | 118 |  |  |  |
| Comparative 4 | 300 | 527 | 1437 |  |  |  |
| Comparative 5 | 299 | 526 | 960 |  |  |  |
| Comparative 6 | 300 | 528 | 1553 |  |  |  |
| Comparative 7 | 298 | 528 | 1783 |  |  |  |
| Comparative 8 | 347 | 581 | 397 | 353 | 583 | 437 |
| Comparative 9 | 348 | 562 | 499 | 348 | 567 | 533 |
| Comparative 10 | 302 | 526 | 2812 | 302 | 527 | 2079 |
| Comparative 11 | 302 | 539 | 2693 | 302 | 537 | 4086 |

Figure 3:
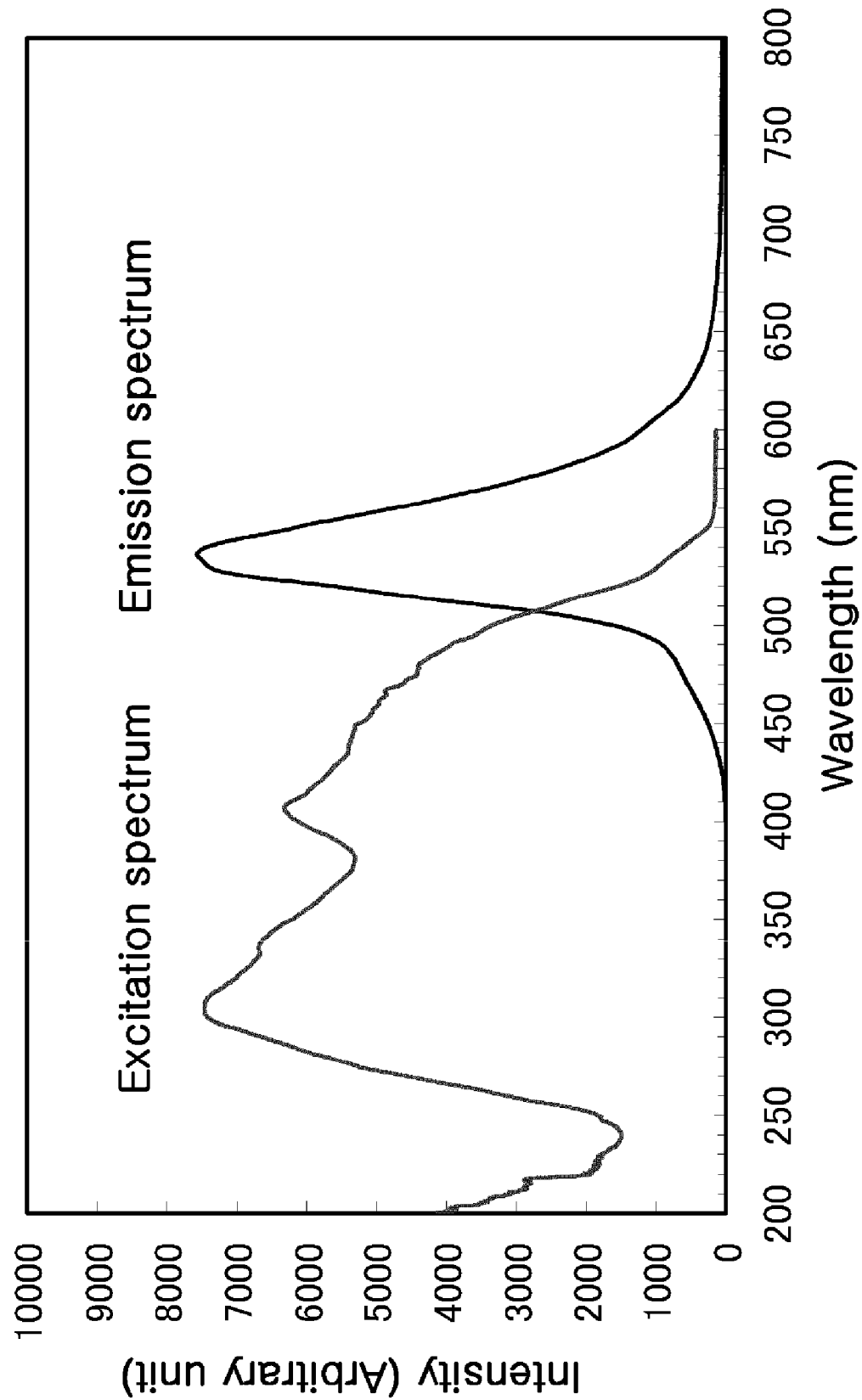
FIG. 3 shows an excitation spectrum and an emission spectrum of fluorescence measurement of Example 7.

By irradiating this powder with a lamp which emits light having a wavelength of 365 nm, it was confirmed that the green light was emitted from the powder. Results of measuring the emission spectra and excitation spectra of these powders using a fluorescent spectrophotometer showed that the phosphors were found to be green phosphors having peaks of the excitation spectra from 260 to 310 nm and peaks of the emission spectra from 520 to 540 nm as shown in Table 4. FIG. 3 shows spectra of Example 7. It can be seen that light from violet to blue colors in the wavelength region from 400 nm to 450 nm can excite the phosphor in addition to the ultraviolet light having the wavelength equal to 380 nm or less. And it was also found that other examples comprised of green phosphors which can be excited by a wide range of light of ultraviolet ray, and from violet to a blue light so as to emit a green light in the same manner as Example 7. Here, the values of counts are in an arbitrary unit since the values may vary depending upon the measurement device and conditions thereof. That is, the values of the counts of the examples and the comparative examples shown here were measured under the same conditions such that these values can be compared, but it is difficult to compare with experimental results of another.

COMPARATIVE EXAMPLES 1 TO 11

Inorganic compound powders as shown in Tables 2 to 4 were prepared in the same manner as the examples except for the compositions and the firing temperatures as shown in Tables 2 to 4. FIGS. 1 and 2 show parameters. As the excitation luminescence spectra of the obtained powders were measured, they showed green color emission, but the emission intensity is lower since the composition range is out of the range of the present invention.

What is claimed is:

1. A phosphor comprising: a sialon crystal in which Eu is solid-solved, the sialon crystal having a $\beta$-$Si_3N_4$ crystal structure and a composition expressed by a composition formula of $Eu_aSi_bAl_cO_dN_e$ (here, a+b+c+d+e=1 in the formula) wherein parameters: a, c, and d satisfy following conditions:

$$0.00035 \leq a \leq 0.002 \tag{1},$$

$$0.008 \leq c \leq 0.025 \tag{2, and}$$

$$0.0005 \leq d \leq 0.01 \tag{3); and}$$

wherein the phosphor emits a green fluorescent light having a peak in a wavelength region of 500 nm to 600 nm upon irradiation of an excitation source.

2. The phosphor according to claim 1 wherein the parameters: a, b, c, d, and e satisfy a following condition: $0.72 \leq (a+b+c)/(d+e) \leq 0.78$.

3. The phosphor according to claim 1, wherein the sialon crystal has a molar composition expressed by a composition formula of: $fSi_3N_4 \cdot gAlN \cdot hEu_2O_3$ (f+g+h=1 in the formula) and wherein parameters: g and h satisfy conditions: $0.04 \leq g \leq 0.14$, and $0.002 \leq h \leq 0.006$.

4. A method of manufacturing a phosphor comprising: a sialon crystal in which Eu is solid-solved, the sialon crystal having a $\beta$-$Si_3N_4$ crystal structure and a composition expressed by a composition formula of $Eu_aSi_bAl_cO_dN_e$ (here, a+b+c+d+e=1 in the formula) wherein parameters: a, c, and d satisfy following conditions:

$$0.00035 \leq a \leq 0.002 \tag{1},$$

$$0.008 \leq c \leq 0.025 \tag{2, and}$$

$$0.0005 \leq d \leq 0.01 \tag{3); and}$$

wherein the phosphor emits a green fluorescent light having a peak in a wavelength region of 500 nm to 600 nm upon irradiation of an excitation source, the method comprising the step of: firing a mixture of silicon nitride powder; aluminum nitride powder; and a raw material including Eu in a nitrogen atmosphere in a temperature range that is at least 1820 degree Celsius and does not exceed 2200 degree Celsius.

5. The method according to claim 4 wherein the raw material including Eu is europium oxide, wherein a mixture molar composition of silicon nitride; aluminum nitride; and europium oxide is expressed by a formula: $iSi_3N_4 \cdot jAlN \cdot kEu_2O_3$ (i+j+k=1 in the formula), and wherein the parameters: j and k satisfy:

$$0.04 \leq j \leq 0.14, \text{ and}$$

$$0.002 \leq k \leq 0.006.$$

6. The phosphor according to claim 2, wherein the sialon crystal has a molar composition expressed by a composition formula of: $fSi_3N_4 \cdot gAlN \cdot hEu_2O_3$ (f+g+h=1 in the formula) and wherein parameters: g and h satisfy conditions: $0.04 \leq g \leq 0.14$, and $0.002 \leq h \leq 0.006$.

7. The method according to claim 4 wherein the parameters: a, b, c, d, and e satisfy a following condition: $0.72 \leq (a+b+c)/(d+e) \leq 0.78$.

8. The method according to claim 4 wherein the sialon crystal has a molar composition expressed by a composition formula of: $fSi_3N_4 \cdot gAlN \cdot hEu_2O_3$ (f+g+h=1 in the formula) and wherein parameters: g and h satisfy conditions: $0.04 \leq g \leq 0.14$, and $0.002 \leq h \leq 0.006$.

* * * * *